Sept. 4, 1951  W. R. BATTLES ET AL  2,567,048
CAR SEAT CONVERTIBLE TO BED
Filed Oct. 27, 1947  3 Sheets-Sheet 1
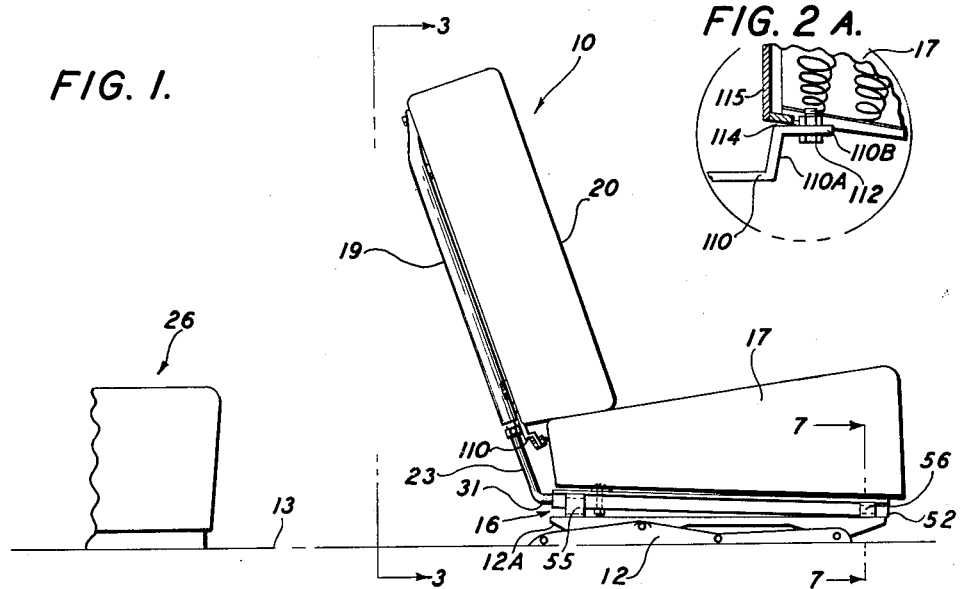
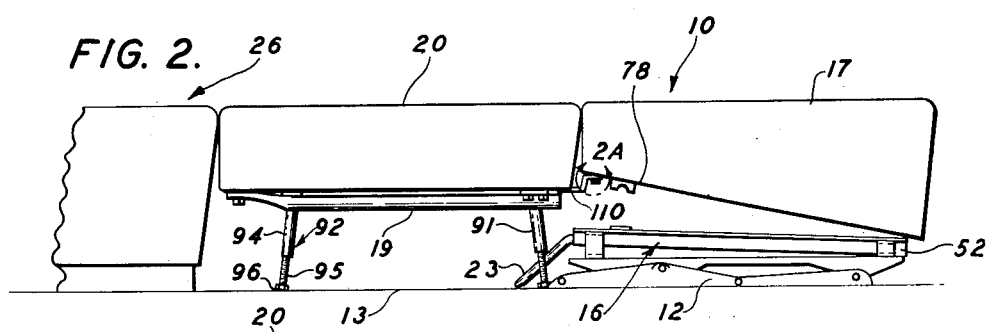
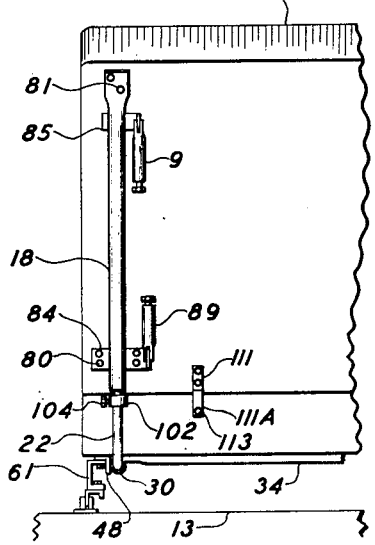
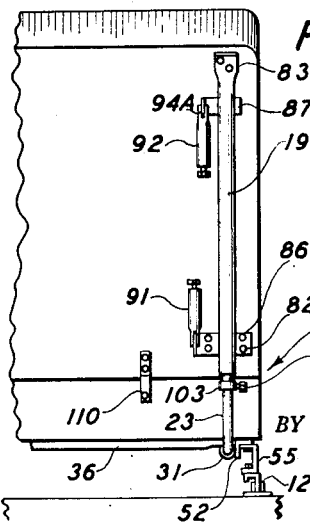
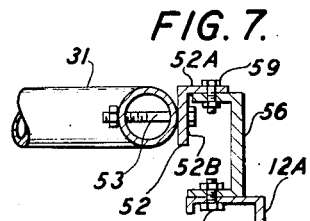
INVENTORS
WILLIS R. BATTLES
RALPH A. BATTLES
BY
ATTORNEYS Sept. 4, 1951 W. R. BATTLES ET AL 2,567,048
CAR SEAT CONVERTIBLE TO BED
Filed Oct. 27, 1947 3 Sheets-Sheet 2
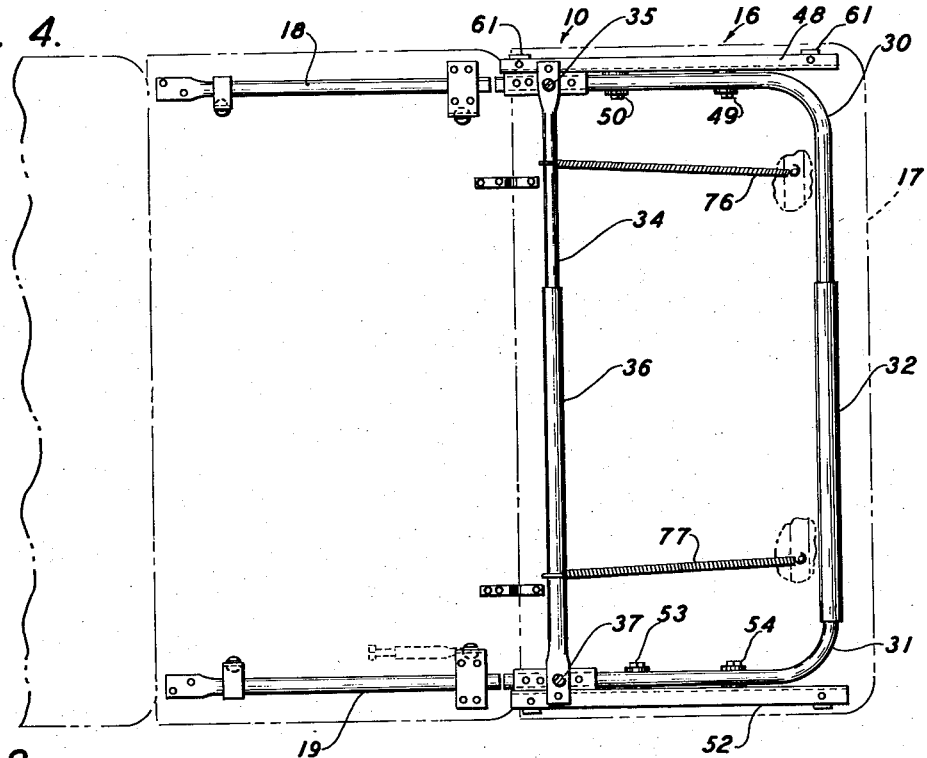
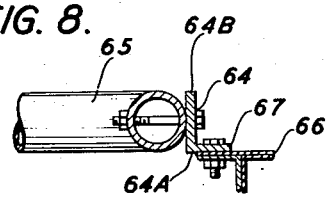
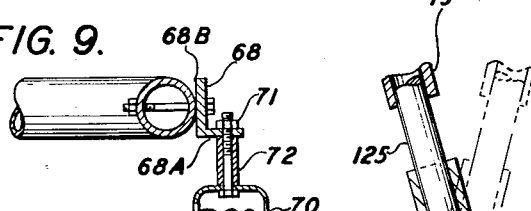
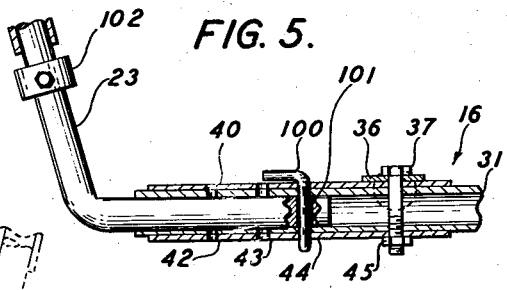
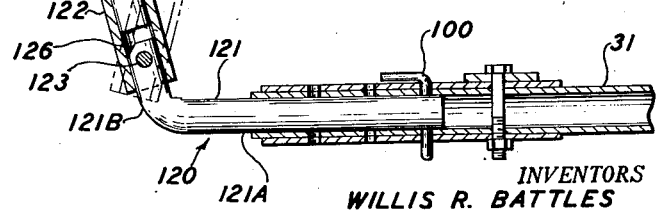
INVENTORS
WILLIS R. BATTLES
RALPH A. BATTLES
BY
ATTORNEYS

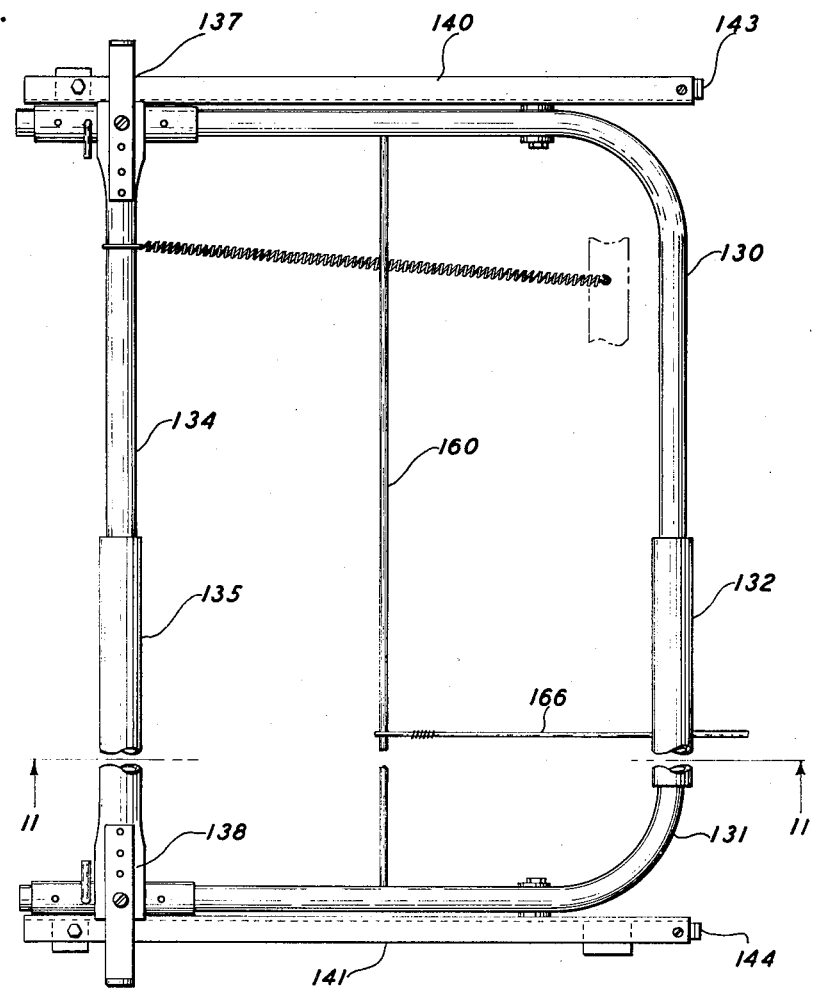
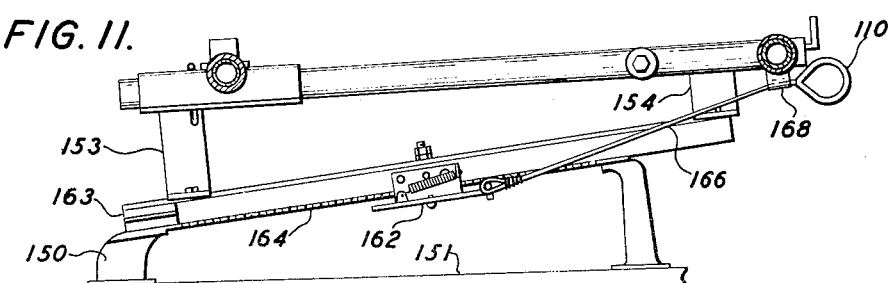

Patented Sept. 4, 1951

2,567,048

UNITED STATES PATENT OFFICE 2,567,048

CAR SEAT CONVERTIBLE TO BED

Willis R. Battles, Redondo Beach, and Ralph A. Battles, El Monte, Calif.

Application October 27, 1947, Serial No. 782,320

6 Claims. (Cl. 155—7)

This invention relates to convertible vehicle seats and more particularly to automobile seats which function as a conventional front seat and which also may be easily and quickly converted to form a bed within the automobile.

It is an object of our invention to provide a highly simplified seat framework which is adapted to be fixed to the seat supporting means in substantially any make of automobile, and to support the conventional seat cushions in pivotal relationship so as to permit use thereof as a seat and also as a bed within the automobile. Many seat structures have been proposed for use in such dual capacity but the majority of these seats have suffered either the disadvantage of being unduly intricate or of lacking sufficient flexibility to permit substitution for the existing seats in the many different makes of automobiles. The seat structure of our invention overcomes both of these disadvantages.

The front seat of an automobile comprises a horizontal seat cushion removably supported above the vehicle floor by a framework which is usually supported by suitable mounting means affixed to the floor. The framework and the mounting means are generally slidable with relation to each other in the direction of the longitudinal axis of the automobile to permit adjustment of the seat position within the automobile to accommodate different drivers. A vertical back-rest cushion is usually rigidly affixed to the framework holding the horizontal seat cushion so that the two cushions will move simultaneously when the framework is slid backwardly or forwardly on the mounting means.

In the application of the apparatus of the present invention the existing seat framework and the vertical back-rest cushion are removed from the automobile and the apparatus of the invention is substituted therefor by mounting the same to the mounting means in the manner hereinafter described. The seat of the invention carries its own vertical cushion affixed to separate members joinable in the manner set forth to the horizontal seat framework substituted for the existing framework in the automobile. By replacing the original horizontal cushion on the substituted framework of the invention, a conventional seating surface is formed.

The apparatus of the invention comprises a framework adapted to be joined to the mounting means affixed to the floor of an automobile and to support a seat cushion in substantially horizontal position, a pair of support arms to which a second (back-rest) cushion is attached and means for detachably joining the support arms to the framework so that the cushion affixed thereto will be in substantially a vertical position in the manner of a conventional automobile seat. It is to be understood that in the foregoing and following description the use of the terms "vertical" and "horizontal" with respect to the seat members or cushions is employed merely for distinguishing purposes and is not intended to imply that either of the cushions are perfectly horizontal or vertical. It is well known for example that the bottom cushion of a seat generally slopes downwardly toward the back and that the back cushion of a seat generally slopes backwardly from the vertical position.

A feature of the invention is the means of joining the back cushion support arms to the framework whereby they may be readily detached therefrom. The support arms of the back-rest cushion are provided with supporting means so that they may be disposed in a substantially horizontal position behind the framework when detached therefrom. In this way a bed may be formed comprising the bottom cushions of the front and back seats of the automobile and the back-rest cushion of the front seat which is horizontally disposed therebetween. To insure the formation of a substantially level bed surface the back-rest cushion support arms are provided with means adapted to support the rear edge of the bottom of the front seat cushion when the back-rest cushion is in the horizontal position.

Still another feature of the apparatus of the invention is its flexibility whereby it is adapted to installation in substantially any standard make of automobile. This flexibility is obtained in part by use of telescoping type construction whereby the framework may be adjusted to suit any particular installation and in part by the simplicity of the back supports which may be separately affixed to a back-rest cushion member at any desired spacing so as to conform to the particular size of the framework required to fit the automobile. By the provision of alternative joining means hereinafter described the framework may be affixed to substantially any existing mounting means within a conventional automobile.

These and other features of the invention will be more clearly understood from the following detailed description thereof taken in relation to the accompanying drawing in which:

Fig. 1 is a partial interior view of an automobile showing the seat member of the invention in its relationship to a conventional back seat;

Fig. 2 is a partial interior view of an automobile showing the seat member of the invention converted to form a bed;

Fig. 2A is an enlarged sectional view of a portion of the seat member of the invention located in the area 2A of Fig. 2;

Fig. 3 is a rear elevation of the seat of the invention;

Fig. 4 is a plan view of the seat of the invention with the cushions shown in phantom so as to illustrate the positioning of the framework when the seat has been converted to a bed;

Fig. 5 is a detailed sectional elevation showing a means of joining the back-rest cushion member to the horizontal framework;

Fig. 6 is a detailed sectional elevation showing the means of joining the back-rest cushion member to the horizontal framework for use in a club coupé or two door sedan;

Fig. 7 is a sectional elevation taken on the line 7—7 of Fig. 1 showing one means of joining the framework of the invention to the conventional supporting means in an automobile;

Fig. 8 is a partial sectional elevation showing an alternative means for joining the seat member of the invention to the automobile support means;

Fig. 9 is a partial sectional elevation showing a third means of joining the seat member of the invention to the automobile support means;

Fig. 10 is a plan view of the horizontal framework with the cushion removed adapted for use in certain types of automobiles and showing one means of releasing the track locking mechanism on the original tracks of the car so that the framework may be slid forward or backward on the tracks in the normal manner; and, Fig. 11 is a sectional elevation taken on the line 11—11 of Fig. 10.

Referring to Figs. 1, 2, 2A, 3 and 4, the convertible seat 10 of the invention is adapted to be mounted on the original seat adjusting tracks 12 affixed to the floor 13 of a conventional automobile. The seat member itself comprises the horizontal framework 16 supporting the horizontal cushion 17, the back-rest cushion support arms 18 and 19 supporting the back-rest cushion 20 and the elbows 22 and 23 joining the supporting arms 18 and 19 respectively to the framework 16. The convertible seat of the invention is shown in the normal driving position spaced from the back seat 26 in the partial interior view of Fig. 1 and converted to form a bed with the back seat 26 in Fig. 2.

Referring particularly to Fig. 4 which is a plan view of the framework of the apparatus with the cushions supported thereby shown in phantom, it will be seen that the horizontal framework comprises the tubes 30, 31 each bent at right angles to form a section projecting longitudinally with respect to the automobile and a section projecting transversely with respect to the automobile. The inwardly projecting or transverse ends of the tubes 30 and 31 are held together by the tubular sleeve 32. This means of joinder permits transverse adjustment between tubes 30 and 31. The rear or longitudinally projecting end of the tubes 30 and 31 are joined to each other by means of the rod 34 affixed by means of the bolt 35 to the tube 31 and slidably disposed at its inner end in a sleeve 36 affixed by means of a bolt 37 to the tube 31.

As shown in Fig. 5 which is a sectional elevation of the rear end of a part of the framework 16, the tube 31 for example is provided with a sleeve 40, the sleeve 40 and the tube 31 being provided with a plurality of transverse holes 42, 43, 44, and 45. The bolt 37, securing the tube 36 to the member 31, projects through one of the holes 45. The sleeve 40 serves to additionally strengthen the end of the tube 31, the additional strength being desirable for reasons hereinafter apparent.

In the embodiment of the invention as shown in Figs. 1 to 4, an angle iron 48 is affixed to the member 30 by means of the bolts 49 and 50 in such position that the horizontal lip of the angle iron is substantially flush with the top of the member 30. In a similar manner angle iron 52 is mounted along the rearwardly extending length of the member 31. This type of mounting as shown in the sectional elevation of Fig. 7 taken on the line 7—7 of Fig. 1, comprises the member 31 to which the angle iron 52 is affixed by means of the bolt 53 and the second bolt 54, (Fig. 4) with the horizonal lip 52A thereof being above the vertical lip 52B and in substantial alignment with the top of the tube 31.

Angle irons 48 and 52 affixed to the members 30 and 31 are employed to joint the framework to the existing mounting means 12 within the automobile. In the particular embodiment shown in Figs. 1, 2, 3 and 7, the framework 16 is mounted at each side to the mounting means 12 by a pair of channel spacers. Thus the member 31 is affixed to the mounting means 12 by the channel members 55 and 56 the lower lips of which are joined to the supporting means 12 and the upper lips of which are joined to the horizontal lip 52A of the angle iron 52. As shown in Fig. 7 the lower lip of the member 56 is affixed to the mounting means 12A by the bolt 58 and the upper lip to the upper lip 52A of the angle iron 52 by the bolt 59. The angle iron 48 is affixed to the support means 12 by the channel members 61 (see Fig. 4) in similar manner. By varying the height of these channel members, i. e. by employing a different height channel member in the back and in the front of the seat the cushion 17 may be adjusted to any desired slope. Different height channel members are ofttimes required to compensate for tilt imparted to the cushion 17 by the original framework which has been removed from the automobile. In the particular embodiment shown the member 12A of the supporting means 12 is slidable therein permitting the longitudinal adjustment of the seat 10.

The mounting means on various types of cars differ somewhat and to accommodate these various types the placement of the angle iron and the joining means between the angle iron and the mounting means may be varied. Thus in Fig. 8 which is a sectional view similar to that shown in Fig. 7 wherein the framework is mounted to a different type of mounting means the angle iron 64 is mounted to the framework member 65 which is similar to the member 31 in Fig. 4, so that the horizontal lip 64A lies below the vertical lip 64B. In the embodiment shown in Fig. 8 the horizontal lip 64A is mounted directly to the mounting means 66 of the automobile by means of a bolt 67. It is of course understood that the horizontal lip 64A is mounted at two places to the member 66.

In Fig. 9 which is also a sectional elevation corresponding to that shown in Fig. 7 a third alternative mounting method is shown adapted to use with certain types of automobiles wherein the angle iron 68 is again mounted with its horizontal lip 68A beneath the lip 68B. The member 68 is affixed to the mounting means 70 by means of the bolt 71 and is spaced therefrom by the bushing 72. By varying the length of the bushings, such as the bushing 72, by which the front and back ends of the angle iron 68 and the like angle iron on the opposite end of the framework are spaced from the mounting means, the framework may be adjusted with respect to the mounting means 70 so that the upper face of the seat cushion will be at substantially the same angle as existed prior to the substitution of the framework of the invention.

As shown in Fig. 4 the framework 10 may be provided with springs 76 and 77 anchored at their forward ends to the floor of the automobile and at their rear ends to the cross member formed by the rod 34 and the tube 36. The springs 76 and 77 have the effect of facilitating forward adjustment of the seat but are not a necessary feature of the invention.

When the seat is in the position as shown in Fig. 1 the yoke 78, and a like yoke on the opposite end of the seat, straddle the cross members 36 and 34 to prevent either forward or rearward motion of the cushion 17. In place of the yoke, in many cases straps may be used with respect to the framework 16 to hold seat cushion in place. In a few cases upwardly projecting bolts catch the under seat cushion, preventing motion.

Again with reference to Figs. 1 to 4, the back-rest cushion 20 as hereinbefore described is supported by means of the support arms 18 and 19 joined to the cushion member 20 at 80, 81, 82 and 83 respectively. Attached to each of the support arms 18 and 19 are a pair of transverse plates, the plates 84 and 85 being affixed to the support arm 18 and the plates 86 and 87 being affixed to the support arm 19. Extending from each of these plates is a leg, the leg 89 being pivotally mounted to the plate 84, and the leg 90 being pivotally mounted to the plate 85, the leg 91 being pivotally mounted to the plate 86, and the leg 92 being pivotally mounted to the plate 87. In this manner the cushion member 20 is provided with four depending legs supporting it from the floor of the automobile when in the horizontal position in the manner shown in Fig. 2. Each of the legs, as for example the leg 92 depending from the plate 87, comprises a tubular upper portion 94 forming a yoke 94A at one end, the yoke 94A being adapted to join pivotally to the plate 87. The lower end of the tubular member 94 is threaded internally to receive the threaded foot 95 having the head 96 which rests on the floor 13 of the automobile when the seat 20 is in the horizontal position. The elevation of the cushion 20 may thus be varied by adjusting the length of the legs. Rubber crutch tips may be used over the ends of the bolts to prevent the legs from marring the floor and also to prevent the legs from slipping on the floor.

The lower end of the support arms 18 and 19 are tubular and adapted to receive one end of the elbows 22 and 23 respectively, the opposite ends of which are inserted in the rear ends of the tubular members 30 and 31. The manner of joining the elbows 22 and 23 is shown in the section view of Fig. 5 wherein the elbow 23 is shown inserted in the rear end of the tube 31. The elbow 23, and similarly the elbow 22, is provided at its horizontal end with a transverse hole 101 which may be made to coincide with any of the holes 42, 43, 44, in the rear end of the tube 31 and through which a pin 100 may be dropped. Thus the pin 100 shown in Fig. 5, projects through the hole 101 in the elbow and through the hole 44 in the tubular member 31 and the sleeve 40.

The support arms 18 and 19 slide over the upwardly projecting ends of the elbows 22 and 23 respectively and the length of the insertion of the elbow in the support arms is controlled by the setting of the collars 102 and 103. The collar 102 comprises a sleeve slidable on the elbow 22 and adapted to be rigidly held at any given spot on the elbow 22 by means of the set screw 104. Similarly the collar 103 is a sleeve slidable on the elbow 23 and adapted to be held thereon at any location by the set screw 105. Thus by adjusting the position of the elbow in the horizontal framework by means shown in Fig. 5, and by adjustment of the insertion of the elbows in each of the support arms 18 and 19 the relative position of the back-rest cushion 20 with respect to the bottom seat cushion 15 may be readily controlled. Further by selection of the angle of bend of the elbows 22 and 23 the slant of the back-rest cushion 20 may also be altered. We have found that this type of connection, i. e. the tube over steel bar, forms a much stronger linkage between the back-rest member and the horizontal framework than can be achieved by the hinges which have been frequently employed in the past.

To convert the seat to a bed, as shown in Fig. 2, the back-rest cushion member 20 is lifted upwardly so as to free the arms 18 and 19 from the elbows 22 and 23 and is placed in the horizontal position shown in Fig. 2 with the legs extending downwardly to support the same off the floor. As shown in Fig. 2, the legs are preferably straddled slightly so as to provide additional rigidity to the cushion member 20 when in the horizontal position. To form a substantially level horizontal surface for use as a bed the rear edge of the bottom cushion 17 of the front seat is lifted upwardly so as to be substantially on the level with the front edge thereof. This is accomplished by the provision along the bottom edge of the back-rest cushion member 20 of support arms 110 and 111 upon which the rear edge of the horizontal cushion 17 may rest when the back-rest cushion 20 is in a horizontal position. By reason of the difference of the thickness between the back edge of the cushion 17 and the lower edge of the back-rest cushion 20 the support arms 110 and 111 are in most instances offset so that the top surface of these two cushions will be substantially level. The relationship of the support arm 110 to the cushion member 17 is shown in detail in Fig. 2A which is an enlarged section view of the area 2A of Fig. 2.

As shown in Fig. 2A the arm 110 is offset at 110A, and the outer extension 110B thereof is provided with a transverse bolt 112 which projects upwardly a short distance within the bottom side of the cushion member 17 and acts as a stop against which the bottom rib 114 of the cushion box 115 abuts. Bolt 112 and a similar bolt 113 projecting transversely through the outer lip 111A of the support arm 111 act as stops which prevent the bottom cushion member 17 from slipping forwardly when the seat is converted to a bed. In this manner the surface formed by the horizontal portion of the rear seat 25, the back-rest cushion member 20 and the bottom cushion member 17 of the front seat is a continuous substantially level surface as shown in Fig. 2 upon which a comfortable and sizable bed may be made.

The elbows 22 and 23 shown in Figs. 1 to 5 are adapted for use in four door model automobiles. A modified type of elbow is provided for use in a two door automobile wherein the back-rest member of the front seat pivots forwardly to permit access to the back seat. Such a modified elbow is shown in sectional elevation in Fig. 6. The elbow 120 as shown in Fig. 6 comprises a member 121 having an elongated horizontal portion 121A which is adapted to be inserted in the rear end of the framework tube such as the framework tube 31 and a short upwardly extending portion 121B. A rectangular channel member 122 is pivoted to the upper part of the extension 121B of the member 121 by means of a pivot pin 123. A straight rod 125 is affixed to and projects above the channel member 122 and is adapted to receive one of the support arms as for example the support arm 19. The upper edge of the extension 121B is chamfered as at 126 to permit the channel member 122 together with the member 125 and the support arm 19 to pivot as shown in dotted lines in Fig. 6. The weight of the back-rest cushion supported by the support arms 19 and a second support arm maintains the channel member 122 in the position shown in solid lines in Fig. 6 in normal circumstances. However, when someone wishes to enter the back seat of a two door vehicle the assembly shown in Fig. 6 permits the rotation of the back of the seat forwardly for this purpose. The use of the elbow 120 is similar to the use of the elbow 23 for example when the seat is to be converted to a bed. Thus as shown in Fig. 2 when the back seat member 20 is lifted off the elbows 22 and 23, the pin 100 is removed so as to permit the elbow such as the elbow 23 to rotate within the member 31 and to rest on the floor 13 of the car. The elbow 120 shown in Fig. 6 will be similarly rotated when the pin 100 is removed therefrom and the back-rest cushion member is lifted free thereof.

In substantially all makes of automobiles the front seat is mountable on a track provided in the mounting means and means are provided for longitudinal movement of the seat in the automobile. Generally means are also provided for locking the seat in any given position to prevent undesired movement thereof. In most cases locking means are provided at both ends of the seat member and these means are simultaneously actuated from one end of the seat, generally the driver's side. The convertible seat structure of the invention does not interfere with the locking means in most automobiles and the seat after installation may be longitudinally adjusted when desired and may be locked in the conventional manner in any given position. However in certain types of automobiles, the substitution of the framework of the invention although not interfering with the adjustability of the seat does interfere with the means normally employed to actuate the locking device. This occurs when the locking means actuating handle projects above the mounting means. In such case it must be removed prior to insertion of the seat of the invention and substitute means for operating the track lock must be provided. In these types of automobiles a flexible rod extends underneath the seat between the locking mechanisms on opposite sides thereof.

This type of construction and the modification included in the framework of the invention are illustrated in the plan view of Fig. 10 and the sectional elevation of Fig. 11 taken on the line 11—11 of Fig. 10. As shown in these figures, the bottom framework is similar to that hereinbefore described and comprises the members 130, 131 housed at their forward end in a sleeve 132 and joined at their rear ends by the rod 134 affixed to member 130 and housed within the tube 135 affixed to the member 131. For use in the cars referred to we have found it necessary to provide an extension cleat at each side of the framework. These extension cleats are shown as the cleats 137 and 138 being joined to the members 130 and 131 respectively at the point of attachment of the rod 134 and the tube 135. It is seen that the cleats 137 and 138 are provided with a plurality of bolting holes along the horizontal portion thereof whereby the projecting thereof from the framework may be adjusted.

As in the foregoing embodiment the members 130 and 131 are provided with angle irons 140 and 141 affixed to the rearwardly projecting portions thereof. In this embodiment the forward ends of the angle irons 140 and 141 are provided with an upwardly projecting stop 143, 144 respectively which engages the lower lip of the front edge of the seat and together with the cleats 137 and 138 holds the cushion member on the framework. As shown in the sectional elevation of Fig. 11 the supporting means 150 affixed to the floor 151 of the automobile is on a considerable slant and for this reason the channel member 153 is considerably longer than the channel member 154. The means of mounting the framework to the support means by the channel members such as the channel members 153 and 154 is shown in detail in Fig. 7 and was described with relation thereto.

In this type of automobile a flexible rod 160 extends beneath the seat and connects the locking means in association with the tracks on each side of the mounting means. Thus the locking means 162 shown in Fig. 1 is in association with the track 163 and engages the ratchet 164. In the conventional seat structure the flexible rod 160 is affixed to the forward portion of the right hand lock (not shown) and the rear of the left hand lock 162. A handle is provided on the seat framework which engages the rod 160 to simultaneously release both locks. To replace the actuating handle which is removed with the seat framework when substituting the framework of the invention we provide a cable 166 connected at one end to the flexible rod 160 and projecting therefrom forwardly through the hanger 168 depending from the sleeve 132 and forming a finger loop 170 at its outer end. By pulling the cable 166 the flexible rod 160 is buckled slightly exerting an inward force on the catch 162 and a similar catch located in association with the opposite track member and the two are released simultaneously to permit even movement of the seat forwardly or backwardly. In order to permit the cable release 166 to accomplish this function the rod 160 is connected to the forward end of the left catch 162 as shown. This modified type of track release finds particular application when the convertible seat of the invention is used in Chrysler products.

As is apparent from the foregoing description and illustrations, we have provided a convenient, simple seat structure adapted to be substituted for the framework in a conventional automobile to function therein either as a seat or bed, the conversion from one to the other being simply achieved. Many modifications may occur to those familiar with automobile design and con-

We claim:

1. A vehicle seat comprising a framework adapted to be mounted in a substantially horizontal position above the floor of the vehicle, a seat cushion supported on said framework, a back rest cushion, a first pair of spaced sockets mounted adjacent the rear edge of the framework, a pair of elbows, one leg of each elbow being inserted in each of said first pair of sockets and rotatable therein, releasable means associated with each of said sockets to prevent rotation of said elbows, a second pair of spaced sockets mounted on said back rest cushion and alignable with said first pair of sockets, the second pair of sockets being slidably mounted over the other legs of said elbows.

2. Apparatus according to claim 1 wherein said other legs of said elbows each consist of two sections pivotally joined to each other on an axis transverse to the axis of the leg, and a guard extends from the outer section along the back side of the inner section to prevent rotation of the outer section away from the said framework.

3. A vehicle seat comprising a framework adapted to be mounted in a substantially horizontal position above the floor of the vehicle and including a pair of tubular members each forming a right angle bend, a sleeve enclosing one end of each of the tubular members, a longitudinally adjustable tie rod joining the opposite ends of the tubular members and a separate angle iron mounted along the said opposite end of each of the tubular members, a seat cushion supported on said framework, a back-rest cushion, a pair of supporting arms mounted to the back of the back-rest cushion, a pair of spaced elbows mounted to the framework and extending rearwardly therefrom, means affixing the support arms to the elbows in detachable relationship so that the back-rest cushion is held in an upright position adjacent the rear edge of the seat cushion when the elbows and support arms are affixed and is independent of the seat cushion when the support arms and elbows are not affixed to each other, and a plurality of legs pivotally mounted to the support arms.

4. A vehicle seat comprising a framework adapted to be mounted in a substantially horizontal position above the floor of a vehicle and including a pair of tubular extensions disposed parallel to each other at opposite sides of the framework and being provided with a plurality of transverse holes therethrough adjacent the rear ends, a seat cushion supported on said framework, a back-rest cushion, a pair of supporting arms mounted to the back of the back-rest cushion, a pair of spaced elbows adapted to slide longitudinally within the rear ends of said tubular extensions, each of said elbows being provided with a transverse hole adjacent the end thereof slidable in the tubular extension, a pair of pins each adapted to project through one of the holes in the tubular extension and through the hole in the elbow disposed therein to lock the elbow within the tubular extension, means affixing the support arms to the elbows in detachable relationship so that the back-rest cushion is held in an upright position adjacent the rear edge of the seat cushion when the elbows and support arms are affixed and is independent of the seat cushion when the support arms and elbows are not affixed to each other, and a plurality of legs pivotally mounted to the support arms.

5. A vehicle seat comprising a framework adapted to be mounted in a substantially horizontal position above the floor of the vehicle, a seat cushion supported on said framework, a back-rest cushion, a pair of support arms mounted to the back of the back-rest cushion, a pair of spaced elbows mounted to the framework and extending rearwardly therefrom, each elbow comprising a metal bar bent to include an angle in excess of 90° so as to form a substantially horizontal length and an approximately upright length and being provided with a collar spaced from an end of its upright length, the horizontal length of the elbows being insertable in the framework and the upright length of the elbows being insertable in the supporting arms to a depth dependent upon the placement of said collar and to affix the support arms to the elbows in detachable relationship so that the back-rest cushion is held in an approximately upright position adjacent the rear edge of the seat cushion when the elbows and support arms are affixed and is independent of the seat cushion when the elbows and support arms are not affixed to each other, and a plurality of legs pivotally mounted to the support arms.

6. A vehicle seat comprising a framework adapted to be mounted in a substantially horizontal position above the floor of the vehicle, a seat cushion supported on said framework, a back-rest cushion, a pair of supporting arms mounted to the back of the back-rest cushion, a pair of spaced elbows mounted to the framework and extending rearwardly therefrom, each elbow comprising a first metal bar bent adjacent one of its ends to form a comparatively short approximately upright section, a second metal bar, a channel member affixed to one end of the second metal bar and pivotally joined to the upright section of the first metal bar and partially enclosing the upright section of the first metal bar so as to permit pivoting of the second metal bar in the direction of the other end of the first metal bar and to prevent pivoting thereof in the reverse direction, said other end of the first metal bar being detachably mounted to said framework, means affixing the support arms to the second metal bars in said elbows in detachable relationship so that the back-rest cushion is held in approximately upright position adjacent the rear edge of the cushion and pivotal toward the seat cushion when the elbows and support arms are affixed and is independent of the seat cushion when the elbows and support arms are not affixed to each other, and a plurality of legs pivotally mounted to the support arms.

WILLIS R. BATTLES.
RALPH A. BATTLES.

REFERENCES CITED

The following references are of record in the file of this patent:

UNITED STATES PATENTS

| Number | Name | Date |
| --- | --- | --- |
| 1,301,488 | Myers | Apr. 22, 1919 |
| 1,390,177 | Taylor | Sept. 6, 1921 |
| 1,454,232 | Gilbert | May 8, 1923 |
| 1,905,605 | Richardson | Apr. 25, 1933 |
| 2,212,682 | Epifano | Aug. 27, 1940 |
| 2,304,199 | Pinnow | Dec. 8, 1942 |

FOREIGN PATENTS

| Number | Country | Date |
| --- | --- | --- |
| 754,189 | France | Aug. 21, 1933 |